United States Patent
Feng

(10) Patent No.: US 10,922,885 B2
(45) Date of Patent: Feb. 16, 2021

(54) INTERFACE DEPLOYING METHOD AND APPARATUS IN 3D IMMERSIVE ENVIRONMENT

(71) Applicant: Beijing Pico Technology Co., Ltd., Beijing (CN)

(72) Inventor: Xue Feng, Beijing (CN)

(73) Assignee: Beijing Pico Technology Co., Ltd., Beijing (CN)

( * ) Notice: Subject to any disclaimer, the term of this patent is extended or adjusted under 35 U.S.C. 154(b) by 226 days.

(21) Appl. No.: 15/296,832

(22) Filed: Oct. 18, 2016

(65) Prior Publication Data
US 2017/0301139 A1    Oct. 19, 2017

(30) Foreign Application Priority Data
Apr. 15, 2016   (CN) .......................... 201610237714.3

(51) Int. Cl.
*G06T 19/00*   (2011.01)
*G06F 3/0482*   (2013.01)
(Continued)

(52) U.S. Cl.
CPC .......... *G06T 19/006* (2013.01); *G06F 3/0481* (2013.01); *G06F 3/0482* (2013.01);
(Continued)

(58) Field of Classification Search
CPC ... G06T 19/006; G06F 3/0481; G06F 3/0482; G06F 3/04886; G06F 17/218;
(Continued)

(56) References Cited

U.S. PATENT DOCUMENTS

2009/0178008 A1*   7/2009   Herz .................... G06F 3/04817
                                                                715/840
2011/0279446 A1*   11/2011   Castro .................... G01C 21/20
                                                                345/419
(Continued)

FOREIGN PATENT DOCUMENTS

CN   102980570 A   3/2013
CN   102981698 A   3/2013
(Continued)

OTHER PUBLICATIONS

State Intellectual Property Office of the People's Republic of China, Office Action in Chinese Patent Application No. 201610237714.3 dated Jun. 6, 2018.

*Primary Examiner* — Jennifer N To
*Assistant Examiner* — Parmanand D Patel
(74) *Attorney, Agent, or Firm* — LKGlobal | Lorenz & Kopf, LLP

(57) ABSTRACT

An interface deploying method and apparatus are provided in a 3D immersive environment. The method includes: arranging an interface element displaying layer and a real scene displaying layer in turn from near to far in a direction of a user's sight line; using a camera device to collect real scenes of a real environment where the user is located, and displaying them to the user by the real scene displaying layer; and setting interface elements to a translucent state, and displaying the interface elements via the interface element displaying layer. In the above manner, the user may observe the changes of the real environment in real time while experiencing the 3D immersive environment, thereby experiencing the 3D immersive environment without affecting realistic basic behaviors.

2 Claims, 1 Drawing Sheet

(51) Int. Cl.
*G06F 3/0488* (2013.01)
*G06F 17/21* (2006.01)
*G06F 3/0481* (2013.01)
*G06F 40/117* (2020.01)

(52) U.S. Cl.
CPC ........ *G06F 3/04886* (2013.01); *G06F 40/117* (2020.01); *G06F 2203/04804* (2013.01)

(58) Field of Classification Search
CPC ......... G06F 40/117; G06F 2203/04804; G06F 3/012; G06F 3/04815; G06F 2203/04802; G05T 19/006
See application file for complete search history.

(56) References Cited

U.S. PATENT DOCUMENTS

| | | | |
|---|---|---|---|
| 2014/0289650 A1* | 9/2014 | Cotlarciuc | G06F 3/0481 715/760 |
| 2015/0067585 A1* | 3/2015 | Won | G06F 3/04817 715/784 |
| 2015/0177927 A1* | 6/2015 | Chaudhri | G06F 3/0485 715/830 |
| 2016/0260261 A1* | 9/2016 | Hsu | G06T 1/20 |
| 2017/0192666 A1* | 7/2017 | McCarthy | H04N 5/23293 |

FOREIGN PATENT DOCUMENTS

| | | |
|---|---|---|
| CN | 103635849 A | 3/2014 |
| CN | 104750249 A | 7/2015 |
| CN | 104977716 A | 10/2015 |
| CN | 105242898 A | 1/2016 |
| CN | 105468419 A | 4/2016 |

\* cited by examiner

INTERFACE DEPLOYING METHOD AND APPARATUS IN 3D IMMERSIVE ENVIRONMENT

CROSS-REFERENCE TO RELATED APPLICATION

This application claims the benefit and priority of Chinese Patent Application No. 201610237714.3 filed Apr. 15, 2016. The entire disclosure of the above application is incorporated herein by reference.

TECHNICAL FIELD

The present disclosure relates to the technical field of virtual reality, and particularly to an interface deploying method and apparatus in a 3D immersive environment.

BACKGROUND

At present, virtual reality technology, through system simulation of 3D dynamic scenes and entity behaviors, enables a user to be immersed in this environment. However, in the 3D immersive environment, the user cannot obtain information of real environment so that he cannot experience the 3D immersive environment while performing realistic basic behaviors. Furthermore, the current interface deploying manners in the 3D immersive environment are mostly exhibited in the form of flat blocks, do not make full use of the characteristics of the 3D immersive environment, do not facilitate operation and degrade the user's experience.

SUMMARY OF THE DISCLOSURE

To enable the user to experience the 3D immersive environment without affecting realistic basic behaviors, the present disclosure provides an interface deploying method and apparatus in a 3D immersive environment.

According to one aspect of the present disclosure, the present disclosure provides an interface deploying method in a 3D immersive environment, comprising:

arranging an interface element displaying layer and a real scene displaying layer in turn from near to far in a direction of a user's sight line;

using a camera device to collect real scenes of a real environment where the user is located, and displaying them to the user by the real scene displaying layer; and setting interface elements to a translucent state, and displaying the interface elements via the interface element displaying layer.

Preferably the method further comprises:

dividing the interface element displaying layer into a secondary operation area and a primary operation area; and using the secondary operation area to display an application tag, and using the primary operation area to display content corresponding to the application tag currently selected by the user.

Preferably the dividing the interface element displaying layer into the primary operation area and the secondary operation area specifically comprises:

dividing a circular area in the interface element displaying layer exactly facing to the user's sight line as the primary operation area by using lines and graphs, and dividing an area in the interface element displaying layer out of the primary operation area as the secondary operation area by using lines and graphs.

Preferably the method further comprises: using the secondary operation area to display user operation information and system prompt information.

Preferably the method further comprises: providing the user with an interface self-defining interface by which the user, according to his own needs, adjusts the number and positions of application tags displayed in the secondary operation area.

According to another aspect of the present disclosure, the present disclosure provides an interface deploying apparatus in a 3D immersive environment, comprising:

a display layer setting unit configured to arrange an interface element displaying layer and a real scene displaying layer in turn from near to far in a direction of a user's sight line;

a real scene displaying unit configured to use a camera device to collect real scenes of a real environment where the user is located, and display them to the user by the real scene displaying layer; and an interface element displaying unit configured to set interface elements to a translucent state, and display the interface elements via the interface element displaying layer.

Preferably the apparatus further comprises:

a dividing unit configured to divide the interface element displaying layer into a secondary operation area and a primary operation area;

the interface element displaying unit comprises a secondary display module and a primary display module, wherein the secondary display module is configured to use the secondary operation area to display an application tag; and the primary display module is configured to use the primary operation area to display content corresponding to the application tag currently selected by the user.

Preferably the dividing unit is specifically configured to divide a circular area in the interface element displaying layer exactly facing to the user's sight line as the primary operation area by using lines and graphs, and divide an area in the interface element displaying layer out of the primary operation area as the secondary operation area by using lines and graphs.

Preferably the secondary display module is further configured to use the secondary operation area to display user operation information and system prompt information.

Preferably the apparatus further comprises a self-defining interface; and by the self-defining interface, the user, according to his own needs, adjusts the number and positions of application tags displayed in the secondary operation area.

Embodiments of the present disclosure have the following advantageous effects: the real scenes of the real environment where the user is located are collected, the collected real scenes are displayed, as a background, in the 3D immersive environment in real time, the translucent interface elements are displayed in a superimposed manner, and the virtual system is combined together with the real scenes. In the above manner, the user may observe the changes of the real environment in real time while experiencing the 3D immersive environment, thereby experiencing the 3D immersive environment without affecting realistic basic behaviors. In a further preferred embodiment, the content corresponding to the application tag currently selected by the user is displayed in a circular area exactly facing to the user's sight line, application tags not selected by the user are displayed in other areas, and the content that the user concerns is displayed in a highlighted manner, so that the user looks in a head-up manner upon viewing these contents, needn't turn head and does not easily feel fatigued. When the user selects a certain content by head movement control, the amplitude of head movement is not excessive, the user can easily operate, and dizziness can be reduced. Meanwhile, the user is provided with an interface self-defining interface so that the user may, according to his own operation habits and likes, move or remove the application tags, which increases the customization of the user interface.

DETAILED DESCRIPTION

Embodiments of the present disclosure will be described below in further detail in conjunction with figures to make the objectives, technical solutions and advantages of the present disclosure clearer.

Figure 1:
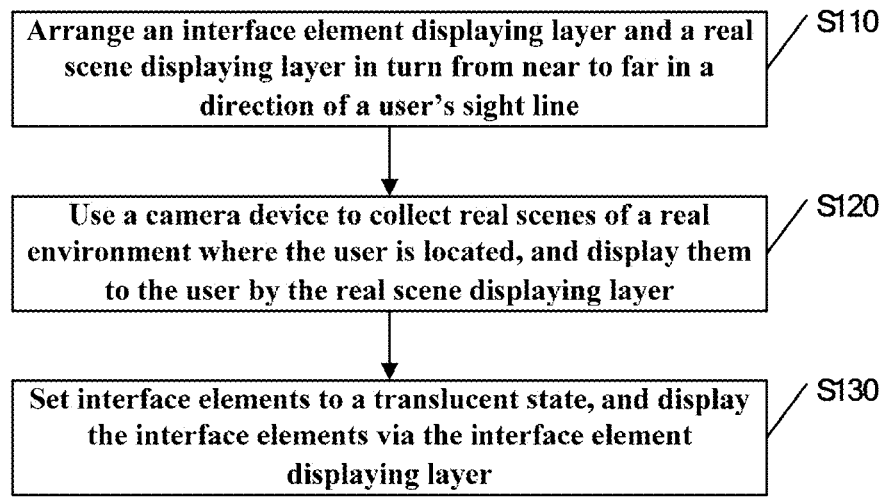
FIG. 1 is a flow chart of an interface deploying method in a 3D immersive environment according to an embodiment of the present disclosure.

FIG. 1 is a flow chart of an interface deploying method in a 3D immersive environment according to an embodiment of the present disclosure. As shown in FIG. 1, the interface deploying method in a 3D immersive environment according to an embodiment of the present disclosure comprises:

Step S110: arranging an interface element displaying layer and a real scene displaying layer in turn from near to far in a direction of a user's sight line.

Step S120: using a camera device to collect real scenes of a real environment where the user is located, and displaying them to the user by the real scene displaying layer.

Step S130: setting interface elements to a translucent state, and displaying the interface elements via the interface element displaying layer.

The real scenes of the real environment where the user is located are collected by using the camera device installed on the virtual reality product, the collected dynamic real scenes are displayed, as a background, in the 3D immersive environment in real time, the translucent interface elements are displayed in a superimposed manner, and the virtual system is combined together with the real scenes. The user may observe the changes of the real environment in real time while experiencing the 3D immersive environment, thereby experiencing the 3D immersive environment without affecting realistic basic behaviors.

The current interface deploying manners in the 3D immersive environment are mostly exhibited in the form of flat blocks, and they cannot display main content in a highlighted manner, nor can they facilitate the user's operation. To provide the user a better visual experience on the visual interface, the interface deploying method in a 3D immersive environment according to a preferred embodiment of the present disclosure further comprises: dividing the interface element displaying layer into a secondary operation area and a primary operation area; and using the secondary operation area to display an application tag, and using the primary operation area to display content corresponding to the application tag currently selected by the user. When the user selects a certain tag or application in the secondary operation area, the content corresponding to the tag or application is displayed in the primary operation area in a highlighted manner so that the user can easily operate these contents and a better user experience is provided.

Figure 2:
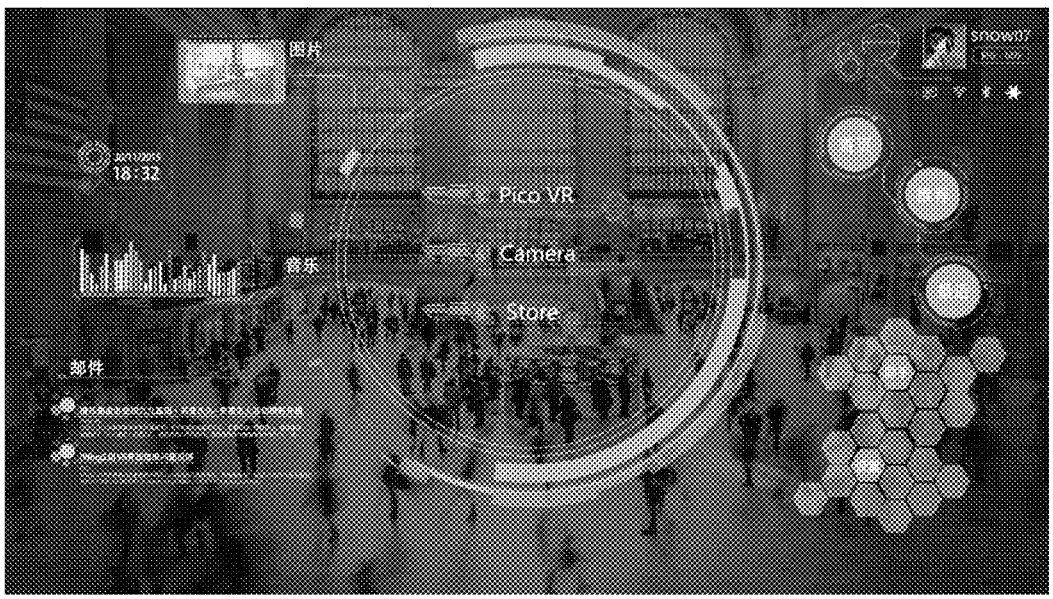
FIG. 2 is an effect view of a user interface deployed by an interface deploying method in a 3D immersive environment according to an embodiment of the present disclosure.

Further preferably, the "dividing the interface element displaying layer into a secondary operation area and a primary operation area" in the interface deploying method in a 3D immersive environment according to an embodiment of the present disclosure specifically comprises: dividing a circular area in the interface element displaying layer exactly facing to the user's sight line as the primary operation area by using lines and graphs, and dividing an area in the interface element displaying layer out of the primary operation area as the secondary operation area by using lines and graphs. The user interface effect is as shown in FIG. 2. When the user views the content displayed by the primary operation area, he looks in a head-up manner and needn't turn head and does not easily feel fatigued. The primary operation area is limited in a circular area. When the user selects certain content in the primary operation area by head movement control, excessive amplitude of head movement is avoided, the user can easily operate, and dizziness can be reduced.

Preferably, the interface deploying method in a 3D immersive environment according to an embodiment of the present disclosure further comprises: using the secondary operation area to display user operation information and system prompt information. While displaying the application tag, the secondary operation area displays operation information and system prompt information to the user in real time so that the user knows an updated dynamic state of the system in time. For example, when the system receives a new mail, the "mail" application tag shown in FIG. 2 will display the title and partial text of the new mail, and send prompt information to the user. Again for example, when the user adds several pictures to the system, the "picture" application tag shown in FIG. 2 will display a picture added by the user most recently or may cyclically display several pictures to reflect the user's latest operation information.

Preferably, the interface deploying method in a 3D immersive environment according to an embodiment of the present disclosure further comprises: providing the user with an interface self-defining interface so that the user may, by the interface and according to his own needs, adjust the number and positions of application tags displayed in the secondary operation area. The user may, according to his own operation habits and likes, move or remove the application tags displayed in the secondary operation area, which increases the customization of the user interface.

Figure 3:
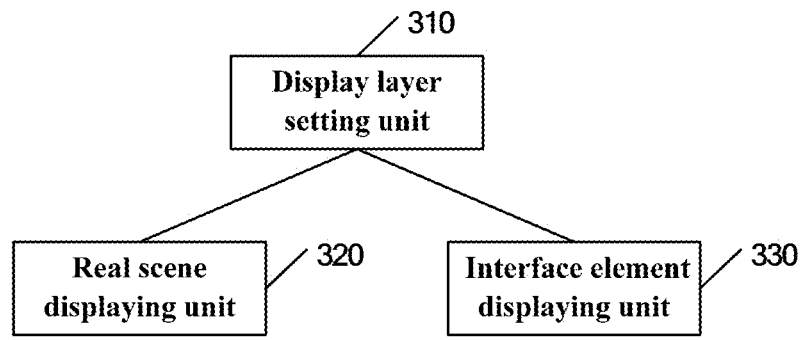
FIG. 3 is a structural schematic view of an interface deploying apparatus in a 3D immersive environment according to an embodiment of the present disclosure.

FIG. 3 is a structural schematic view of an interface deploying apparatus in a 3D immersive environment according to an embodiment of the present disclosure. As shown in FIG. 3, the interface deploying apparatus in a 3D immersive environment according to an embodiment of the present disclosure comprises a display layer setting unit 310, a real scene displaying unit 320 and an interface element displaying unit 330.

The display layer setting unit 310 is configured to arrange an interface element displaying layer and a real scene displaying layer in turn from near to far in a direction of a user's sight line. The real scene displaying unit 320 is configured to use a camera device to collect real scenes of a real environment where the user is located, and display them to the user by the real scene displaying layer 320. The interface element displaying unit 330 is configured to set interface elements to a translucent state, and display the interface elements via the interface element displaying layer. The user may observe the changes of the real environment in real time while experiencing the 3D immersive environment, thereby experiencing the 3D immersive environment without affecting realistic basic behaviors.

Preferably, the interface deploying apparatus in a 3D immersive environment according to an embodiment of the present disclosure further comprises a dividing unit. The dividing unit is configured to divide the interface element displaying layer into a secondary operation area and a primary operation area. The interface element displaying unit 330 comprises a secondary display module and a primary display module, wherein the secondary display module is configured to use the secondary operation area to display an application tag; and the primary display module is configured to use the primary operation area to display content corresponding to the application tag currently selected by the user. The primary content is displayed in a highlighted manner, the user can easily view and operate the content, and a better visual experience is provided.

Preferably, the dividing unit is specifically configured to divide a circular area in the interface element displaying layer exactly facing to the user's sight line as the primary operation area by using lines and graphs, and divide an area in the interface element displaying layer out of the primary operation area as the secondary operation area by using lines and graphs. When the user views the content displayed by the primary operation area, he looks in a head-up manner and needn't turn head and does not easily feel fatigued. When the user selects certain content in the primary operation area by head movement control, the amplitude of head movement is not excessive, the user can easily operate, and dizziness can be reduced.

Preferably, the secondary display module is further configured to use the secondary operation area to display user operation information and system prompt information.

Further preferably, the interface deploying apparatus in a 3D immersive environment according to an embodiment of the present disclosure further comprises a self-defining interface by which the user may, according to his own needs, adjust the number and positions of application tags displayed in the secondary operation area, which increases the customization of the user interface.

To conclude, the interface deploying method and apparatus in a 3D immersive environment according to the present disclosure, as compared with the prior art, have the following advantageous effects:

The real scenes of the real environment where the user is located are collected, the collected real scenes are displayed, as a background, in the 3D immersive environment in real time, the translucent interface elements are displayed in a superimposed manner, and the virtual system is combined together with the real scenes. In the above manner, the user may observe the changes of the real environment in real time while experiencing the 3D immersive environment, thereby experiencing the 3D immersive environment without affecting realistic basic behaviors.

The content corresponding to the application tag currently selected by the user is displayed in a circular area exactly facing to the user's sight line, application tags not selected by the user are displayed in other areas, and the content that the user concerns is displayed in a highlighted manner, so that the user looks in a head-up manner upon viewing these contents, needn't turn head and does not easily feel fatigued. When the user selects a certain content by head movement control, the amplitude of head movement is not excessive, the user can easily operate, and dizziness can be reduced.

The user is provided with an interface self-defining interface so that the user may, according to his own operation habits and likes, move or remove the application tags, which increases the customization of the user interface.

What are described above are only preferred embodiments of the present disclosure and not intended to limit the protection scope of the present disclosure. Any modifications, equivalent substitutions and improvements made within the spirit and principle of the present disclosure are all included in the protection scope of the present disclosure.

It should be explained that:

The embodiments of the components of the present disclosure can be implemented as hardware, as a software module executed on one or more processors, or as their combination. A person skilled in the art should understand that, microprocessors or digital signal processors (DSP) can be employed in practice to implement some or all of the functions of some or all of the components according to the embodiments of the present disclosure. The present disclosure can also be implemented as devices or device programs for executing some or all of the method described herein (for example, computer programs and computer program products). Such programs for implementing the present disclosure can be stored in computer readable media, or can be in the form of one or more signals. Such signals can be obtained by being downloaded from internet websites, or be provided by carrier signals, or be provided in any other forms.

The interface deploying apparatus in a 3D immersive environment of the present disclosure traditionally comprises a processor and a computer program product or a computer readable medium in the form of memory. The memory can be an electronic memory such as a flash memory, an EEPROM, an EPROM, a hard disk or a ROM and the like. The memory has a storage space for executing the program code of any method step of the above method. For example, the storage space for the program code can comprise each of the program codes for individually implementing the steps of the above method. These program codes can be read out or written in from one or more computer program products to the one or more computer program products. The computer program products comprise program code carriers such as hard disk, compact disk (CD), memory card or floppy disk and the like. Such computer program products are generally portable or fixed storage units. The storage units can be similarly disposed memory segments, storage spaces or the like. The program code can for example be compressed in appropriate forms. Generally, the storage units comprise computer readable codes for executing the method steps according to the present disclosure, that is, codes that can be read by for example processors, and when the codes are executed, the interface deploying apparatus in a 3D immersive environment executes each of the steps of the method described above.

It should be noted that, the above embodiments are intended to illustrate the present disclosure, rather than limiting the present disclosure, and a person skilled in the art can design alternative embodiments without departing from the scope of the attached claims. The word "comprise" does not exclude the elements or steps that are not listed in the claims. The present disclosure can be implemented by means of hardware that comprise numbers of different elements and by means of computers that are properly programmed. In claims that list numbers of units of devices, some of these devices can be embodied via the same hardware item.

The description provided herein illustrates many concrete details. However, it can be understood that, the embodiments of the present disclosure can be implemented without the concrete details. In some embodiments, well known methods, structures and techniques are not described in detail, so as not to obscure the understanding of the description. The languages used in the description are chosen mainly for sake of readability and teaching, and are not intended to interpret or define the subject matter of the present disclosure.

What is claimed is:

1. An interface deploying method based on virtual reality in a 3D immersive environment, wherein the method comprises:

arranging an interface element displaying layer and a real scene displaying layer in turn from near to far in a direction of a user's sight line;

using a camera device to collect real scenes of a real environment where the user is located, and displaying them to the user by the real scene displaying layer; and setting interface elements to a translucent state, and displaying the interface elements via the interface element displaying layer; and dividing a circular area in the interface element displaying layer exactly facing to the user's sight line as the primary operation area by using lines and graphs, dividing an area in the interface element displaying layer out of the primary operation area as the secondary operation area by using lines and graphs, using the secondary operation area to display application tags currently not selected by the user, and using the primary operation area to display content corresponding to the application tag currently selected by the user;

wherein when the user selects a certain application tag in the secondary operation area, the content corresponding to the application tag is displayed in the primary operation area in a highlighted manner;

wherein the method further comprises: providing the user with an interface self-defining interface by which the user, according to his own needs, adjusts the number and positions of application tags displayed in the secondary operation area;

wherein the method further comprises: using the secondary operation area to display user operation information and system prompt information; and while displaying the application tag, the secondary operation area displays the user operation information and the system prompt information to the user in real time so that the user knows an updated dynamic state of the system in time.

2. An interface deploying apparatus based on virtual reality in a 3D immersive environment, wherein the apparatus comprises a processor and a computer readable medium, the computer readable medium stores a computer readable code that is readable by the processor, and the processor executes the computer readable code to implement the following steps:

arranging an interface element displaying layer and a real scene displaying layer in turn from near to far in a direction of a user's sight line;

using a camera device to collect real scenes of a real environment where the user is located, and displaying them to the user by the real scene displaying layer;

setting interface elements to a translucent state, and displaying the interface elements via the interface element displaying layer; and dividing a circular area in the interface element displaying layer exactly facing to the user's sight line as the primary operation area by using lines and graphs, dividing an area in the interface element displaying layer out of the primary operation area as the secondary operation area by using lines and graphs, using the secondary operation area to display application tags currently not selected by the user, and using the primary operation area to display content corresponding to the application tag currently selected by the user;

wherein when the user selects a certain application tag in the secondary operation area, the content corresponding to the application tag is displayed in the primary operation area in a highlighted manner;

wherein the processor executes the computer readable code further to implement the following steps:

providing the user with an interface self-defining interface by which the user, according to his own needs, adjusts the number and positions of application tags displayed in the secondary operation area; and wherein the processor executes the computer readable code further to implement the following steps: using the secondary operation area to display user operation information and system prompt information; and while displaying the application tag, the secondary operation area displays the user operation information and the system prompt information to the user in real time so that the user knows an updated dynamic state of the system in time.

* * * * *